Patented June 10, 1952

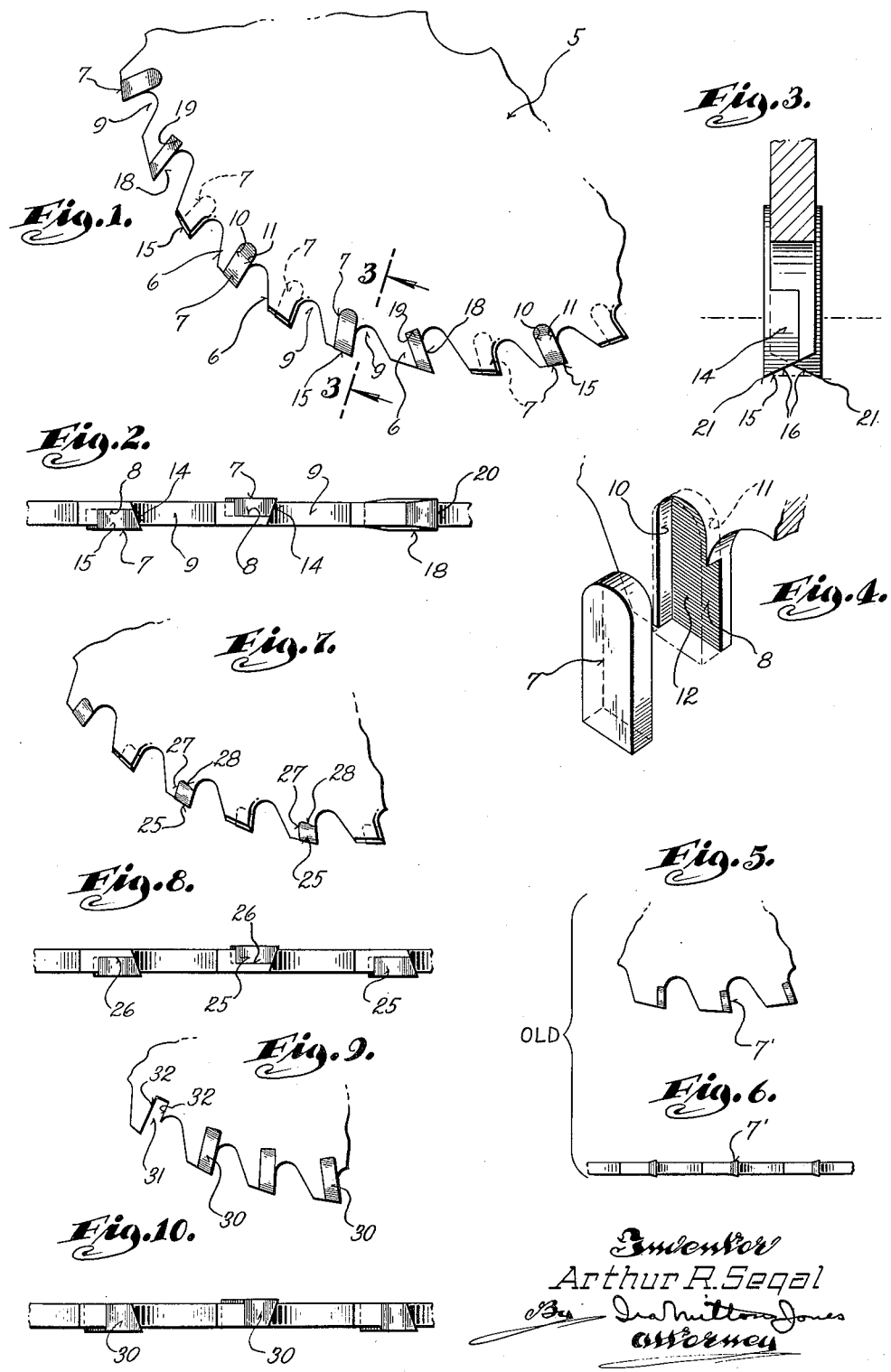

2,600,272

UNITED STATES PATENT OFFICE 2,600,272

CIRCULAR SAW

Arthur R. Segal, Milwaukee, Wis.

Application February 25, 1949, Serial No. 78,390

1 Claim. (Cl. 143—133)

This invention relates to circle saws having teeth provided with carbide cutting tips, such as shown and described in my copending patent application, Serial No. 791,694, filed December 15, 1947, now abandoned.

As brought out at length in the aforesaid patent application, the provision of carbide cutting tips for cutting tools, particularly on the front faces of the teeth of circle saws has constituted one of the greatest advances of cutting tools in recent years. Such tools having carbide cutting tips thereon may be operated at much higher cutting speeds to achieve far greater production than was possible in the past with hardened steel tools. Moreover, the carbide tips for the tools have the ability to stay sharp over a far greater period of use than the conventional hardened steel tools, thus requiring less sharpening.

However, since carbide is relatively brittle and easily broken if improperly used extreme care must be exercised in the securement of carbide cutting tips to the tools to assure that the tips will be subjected as much as possible to compressive forces during use and to avoid wherever possible shearing stresses which might break the carbide.

For this reason circular saws provided with carbide cutting tips on their teeth have always had to have the tips mounted on the fronts of the teeth at a relatively small positive cutting angle, and seldom, if ever, were allowed to have any face shear angle, so that the tips were subjected almost solely to compressive forces during use. Obviously, truly efficient cutting could not be realized with this manner of mounting the tips on the saw teeth, and cutting was accomplished by a more or less scraping action of the tips.

It was also customary to seat the cutting tips in right angular notches in the fronts of the cutting teeth, with the back and bottom surfaces of the tips brazed to the two sides of the notches and the entire fronts of the tips exposed at the fronts of the teeth. Consequently, the tips could be brazed to only limited areas of the saw teeth, and the brazed joints were not secure enough to allow any appreciable degree of face shear angle on the tips because of the lateral tilting forces which such angles impose on the tips during use of the saw. Also, there was always the danger of the tips breaking loose from their brazed joints with the saw teeth as a result of the forward tilting forces to which the inner ends of the tips were subjected during use of the saw.

With these objections in mind, it is the main object of the present invention to provide a greatly improved manner of mounting carbide cutting tips upon cutting tools and particularly the teeth of circle saws, and which will enable substantial cutting angles to be ground upon the tips to effect highly efficient cutting without the danger of rupturing the brazed joints between the tips and the saw teeth during use of the saw.

More specifically this invention has as its object the securement of carbide cutting tips in pockets formed in the teeth of a circle saw, which pockets provide opposing surfaces on the saw teeth to engage the fronts and backs of the cutting tips at their inner ends and thus positively preclude rupturing of the brazed joints between the tips and the teeth by the forward tilting forces exerted upon the inner ends of the tips during use of the saw.

Another object of this invention resides in the provision of a circle saw having cutting tip receiving pockets formed in the teeth thereof to afford relatively large areas for the brazing of the tips to the teeth.

Still another object of this invention resides in the provision of a circle saw of the character described wherein alternate teeth of the saw have carbide cutting tips secured thereto and projecting only from one side of the saw, while teeth between the said alternate teeth have cutting tips secured thereto and projecting only from the opposite side of the saw.

With the above and other objects in view, which will appear as the description proceeds, this invention resides in the novel construction, combination and arrangement of parts substantially as hereinafter described and more particularly defined by the appended claim, it being understood that such changes in the precise embodiment of the herein disclosed invention may be made as come within the scope of the claim.

The accompanying drawing illustrates several complete examples of the physical embodiment of the invention constructed according to the best modes so far devised for the practical application of the principles thereof, and in which:

Figure 1 is a side elevational view of a portion of a circular saw for cutting wood and illustrating the application of this invention to the teeth thereof;

Figure 2 is an enlarged view looking edgewise at one portion of the saw of Figure 1;

Figure 3 is a fragmentary sectional view taken along the plane of line 3—3 of Figure 1;

Figure 4 is a perspective view of one of the saw teeth showing a cutting tip alongside the tooth and about to be seated in a pocket formed in one side of the tooth;

Figures 5 and 6 are fragmentary views of a circle saw having carbide cutting tips attached to the teeth thereof in a conventional manner;

Figure 7 is a view similar to Figure 1 but illustrating a slightly modified embodiment of the invention;

Figure 8 is an enlarged view looking edgewise at a portion of the saw of Figure 7;

Figure 9 is a view similar to Figure 1 but showing still another embodiment of the invention; and Figure 10 is an enlarged view looking edgewise at a portion of the saw illustrated in Figure 9.

Referring now more particularly to the accompanying drawing in which like numerals identify like parts, the numeral 5 designates a circular saw of the type used for sawing wood, only a portion of the saw blade being shown. While the present invention is applicable to any type of circle saw, the saw blade here illustrated is of the "combination" type inasmuch as the teeth thereof are adapted to accomplish cutting in a plurality of different ways, as will appear hereinafter. The teeth 6, however, are substantially equally spaced about the periphery of the saw, and each has a carbide cutting tip fixed thereto, as by brazing, not shown.

In the combination saw illustrated, a group of four adjacent saw teeth may be termed "trimmer" teeth and have carbide cutting tips 7 affixed thereto, as by brazing. The carbide tips 7 are elongated and are received flatwise in pockets 8 shaped to fit the tips and opening to the sides and fronts of the teeth as best shown in Figure 4.

As compared to the carbide cutting tips 7' of the conventional saw illustrated in Figures 5 and 6, the tips 7 of this invention have slightly less thickness, at least twice the width (circumferential) as their thickness, and have a length about twice their width. These tips extend inwardly and rearwardly toward the saw body away from the front of the saw teeth to have their rounded inner ends received in the bottoms of the pockets and securely anchored thereby to preclude forward tilting of the inner ends of the tips out of the pockets. Actually the pockets extend inwardly toward the saw body a distance beyond the gullets or throats 9 between the saw teeth so that the inner ends of the tips 7 are embraced by opposing walls defining the back and front sides 10 and 11 respectively of the pockets at their inner ends. These surfaces of the pockets along with the flat bottom 12 thereof provide surfaces many times the area which was available in the past for brazing of the carbide tips to the saw teeth, as will be apparent from a comparison of Figures 1 and 4 with Figures 5 and 6.

The pockets on adjacent teeth of the group of "trimmer" teeth open to opposite sides of the body of the saw so that the carbide cutting tips 7 on alternate teeth of the group project laterally from only one side of the saw, with the tips on teeth between said alternate teeth projecting laterally from only the opposite side of the saw. This is possible because of the fact the pockets 8 have less depth (measured across the thickness of the saw) than the thickness of the tips 7 seated and brazed therein, and it should be noted that the projecting sides of the tips 7 lie in a pair of planes, one at each side of the saw, and spaced from but parallel to the sides of the saw blade.

Because of the relatively great bonding area between the cutting tips 7 and the portions of the saw teeth defining the pockets 8 and also because of the shape of the pockets, the tips receive maximum support in all directions of the thrust loads developed during sawing. This makes it possible to provide the leading faces of the cutting tips with a relatively large shear angle 14, as seen best in Figure 2, by which highly efficient cutting action is achieved without danger of the tips breaking loose from their brazed joints due to lateral tilting forces exerted on the faces of the tips. The face shear angle may be as high as 30°, where previously it was seldom possible to provide the tips with a face shear angle as great as 10° because of the relative insecurity of the brazed joint between the tips and the teeth which could not withstand the forces tending to tilt the tips laterally during cutting.

In the present case, however, while the face shear angle on the cutting tips is substantial, the relatively greater bonding surface between the cutting tips and their teeth along with the relatively large surface to surface engagement between the outer flat faces of the tips and the sides of the saw cut during use of the saw assures that the tips will not tilt laterally out of their pockets 8.

It will also be noted that adjacent cutting tips 7 have opposite face shear angle, and that the outer ends 15 of the tips are bevelled as at 16 with the bevels on adjacent tips opposite to one another to produce sharp cutting points on the tips at their outer projecting faces, as seen best in Figure 3. Hence, by reason of the opposite bevel and the relatively great face shear angle the tips produce a clean cut in the wood during use of the saw without any danger of the saw splintering the wood at the sawed edges thereof.

In the "combination" type saw illustrated each group of trimmer teeth is comprised of four teeth. Between each group of trimmer teeth is a saw tooth provided with a carbide raker tip 18 which is likewise elongated but which is received in a pocket-like notch 19 extending inwardly and rearwardly from the front of each tooth from side to side of the blade so as to anchor the inner ends of the raker teeth in a manner similar to that in which the trimmer teeth are anchored.

The raker tips 18 have slightly greater thickness than the saw blade and project laterally from opposite sides of the blade a distance slightly less than the trimmer tips 7. The tips 18 also have a square cutting edge 20 on their outer extremities substantially parallel to the axis of the saw blade, and which cutting edge travels in an arc having slightly less radius than the cutting points of the trimmer tips 7.

While the cutting pressures are greatly reduced through the provision of the large face shear angle on the trimmer tips 7, the ideal cutting action is achieved by the use of raker tips with the trimmer tips. These raker teeth are adapted to remove the material at the center of the cut, thus further reducing the cutting pressures on the trimmer tip as well as on the material being cut.

Referring to Figure 3 it will be seen that the opposite cutting points 21 of the trimmer teeth will shear the material at the sides of the cut and produce a more or less V-shaped cut at opposite sides of the median plane of the blade. This leaves a substantially inverted V-shaped land in the bottom of the cut which land is removed by the raker tips 18 following each group of trimmer teeth. Inasmuch as the raker tips have slightly less width along their cutting edges than the width of the saw cut made by the trimmer teeth, they cannot contact the sides of the cut in the wood but easily chisel out the "center" section of the cut. Consequently, only the extreme points of the trimmer tips produce the sides of the cut and they perform their function in such an efficient manner that thin veneer materials such as formica, plywood, and the like can be cut without any danger of splintering of these materials at the sawed edges.

The saw is also a distinct improvement over past types of saws of this nature by reason of the fact that the carbide cutting tips thereon may be reground a great number of times by grinding operations carried out either on the face or on the outer ends of the tips. In this respect regrinding of the tips may continue until at least half of the length of the tips are used up, at which time it may be necessary to deepen the gullets or throats 9 between the teeth.

In making up the saw illustrated in Figure 1, the pockets 8 are formed preferably by an end mill, and the tips 7 are brazed in place in their pockets and thereafter ground to sharpen the same and to provide them with relatively great face shear angles and opposite bevels on their outer ends. The notches 19 for the raker teeth likewise may be cut into the fronts of the teeth in any desired manner, and the tips 18 brazed therein prior to grinding of the tips.

In the embodiment illustrated in Figures 7 and 8, the cutting tips 25 approach more closely the conventional, that is, they have less length than the elongated tips 7 of the previous embodiment. However, the tips 25 are likewise seated in pockets 26 opening to one side and the front of each of the saw teeth, with the pockets on adjacent teeth formed in opposite sides of the blade. These cutting tips also have a relatively great face shear angle and have their outer ends provided with opposite bevels as in the previous embodiment.

Here again, however, the advantage of providing a relatively great brazing surface on the tooth is achieved by the formation of the pockets in the sides of the teeth, and in the formation of the inner ends of the pockets in a manner such that forward tilting of the inner ends of the tips in consequence to the forces to which they subjected during use is positively precluded. As shown best in Figure 7 is will be noted that back side 27 of the pocket and the bottom side 28 thereof are disposed at an acute angle to one another to provide wall portions on the saw teeth which substantially oppose one another and engage back and front portions of the tips at their inner ends to anchor the tips against breaking loose from their brazed joints by the forward tilting forces to which the inner ends of the tips are subjected during use of the saw.

The saw shown in Figure 7 has no raker teeth such as those provided in the previous embodiment of the invention, and is known as a "trimmer" saw. It is likewise especially useful for the sawing of thin plywoods and veneers as well as such sheet materials as formica without any danger of splintering the material at the sawed edges thereof.

The saw shown in Figures 9 and 10 is one having carbide cutting tips 30 secured in pocket-like slots 31 in the fronts of the teeth similar to the slots 19 in the Figure 1 embodiment of the invention and in which the raker tips 19 are secured. While the provision of pocket-like slits 31 in the front portions of the teeth does not provide the relatively great bonding surface afforded in the Figure 1 and 7 embodiments of the invention, the inward extension of the pockets to provide opposite surfaces 32 for engagement with the front and back sides of the tips at their inner ends likewise securely anchors the tips against tilting forwardly at their inner ends.

Since the pocket-like slits 31 extend entirely through the saw blade from one side to the other thereof the carbide cutting tips 30 preferably have a greater thickness than the saw blade so as to utilize as much as possible of the bonding surface on the teeth afforded by the slits. Thus, the tips 30 on alternate teeth are brazed in their pockets 31 with one side of the tips flush with one side of the saw blade, and with the sides of the remaining tips flush with the opposite side of the saw blade. In this manner, alternate tips project only from one side of the blade, while the remaining tips project only from the opposite side of the blade, as seen best in Figure 10.

These cutting tips also have a relatively large face shear angle since the inner ends of the tips are so firmly anchored in their pockets that there is no danger of the tips being tilted either laterally or forwardly at their inner ends by the forces exerted on the tips during cutting. The tips 30 also preferably have their outer ends oppositely bevelled, as described previously for maximum cutting efficiency.

From the foregoing description taken in connection with the accompanying drawing, it will be readily apparent to those skilled in the art that this invention provides a circle saw having carbide cutting tips secured to the teeth thereof in a manner such as to afford full support for the carbide cutting tips in all directions of the thrust loads developed during sawing, and which enables the tips to be provided with far greater face shear angles than was possible heretofore for maximum cutting efficiency without danger of the tips breaking away from their teeth.

What I claimed as my invention is:

A circle saw of the type having spaced teeth projecting from its body characterized by the provision of a cutting tip seated in a pocket formed in the side of each of the teeth and opening to the front thereof with the tips fixed to the portions of the teeth defining said pockets, said pockets being formed to provide opposing walls between which the inner ends of the tips are received and which securely anchor the tips against displacement by the forward tilting forces to which their inner ends are subjected during use of the saw, and alternate teeth having their pockets opening to one side of the saw with teeth interposed between said alternate teeth having their pockets opening to the opposite side of the saw.

ARTHUR R. SEGAL.

REFERENCES CITED

The following references are of record in the file of this patent:

UNITED STATES PATENTS

| Number | Name | Date |
|---|---|---|
| 492,407 | Mallette | Feb. 28, 1893 |
| 529,538 | Vaughan | Nov. 20, 1894 |
| 1,842,789 | Langenbach | Jan. 26, 1932 |
| 2,351,112 | Day | June 13, 1944 |

FOREIGN PATENTS

| Number | Country | Date |
|---|---|---|
| 377,558 | Germany | June 21, 1923 |
| 617,615 | Germany | Aug. 22, 1935 |
| 537,764 | Great Britain | July 4, 1941 |